A. STRICKERT.
SILO HOOP SPRING DEVICE.
APPLICATION FILED JULY 1, 1915.
1,179,363.
Patented Apr. 11, 1916.
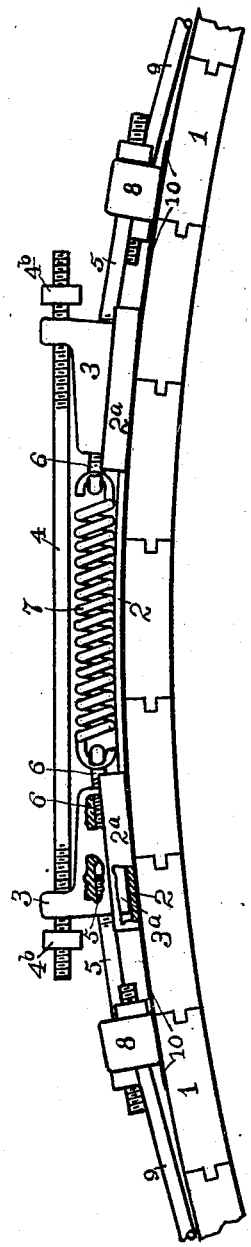
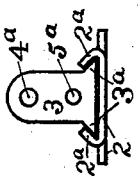
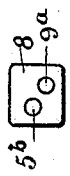
WITNESSES
Albert Strickert INVENTOR
BY David E. Lain
ATTORNEY

UNITED STATES PATENT OFFICE.

ALBERT STRICKERT, OF LYNDEN, WASHINGTON, ASSIGNOR OF ONE-HALF TO JOHN W. KIRKPATRICK, OF LYNDEN, WASHINGTON.

SILO-HOOP-SPRING DEVICE.

1,179,363. Specification of Letters Patent. Patented Apr. 11, 1916.

Application filed July 1, 1915. Serial No. 37,415.

*To all whom it may concern:*

Be it known that I, ALBERT STRICKERT, a citizen of the United States, and a resident of Lynden, in the county of Whatcom and State of Washington, have invented certain new and useful Improvements in Silo-Hoop-Spring Devices, of which the following is a specification.

My invention relates to improvements in silo-hoop-spring devices and the objects of my invention are to provide elastic means which will operate to retain the hoops in operative tenseness on the silo and yet permit of the usual shrinking and swelling of the silo staves due to changing conditions of moisture of the same and also, means to permit the easy removal of the hoop springs without loosing the hoops of which they form a part.

The device by which I accomplish these objects is illustrated in the accompanying sheet of drawings in which—

Figure 1 is a plan view of my silo-hoop-spring device in operative position on a silo, only a part of which is shown, and Figs. 2 and 3 are end-elevation views of parts shown in Fig. 1.

Similar characters refer to similar parts in the several views. Certain parts are broken into in order the better to show other parts hidden thereby.

A portion of the silo body is represented by 1, a long metal plate 2 has the edges of its end portions bent over to form the slide-way guides $2^a$ Figs. 1 and 3. In the slide-ways thus formed are engaged the head blocks 3, 3 each of which has a broadened bottom with beveled edges $3^a$, $3^a$ to fit and operate in said slideways in sliding relation. Each of head blocks 3 has the hole $4^a$, Fig. 3, large enough to easily accommodate the bolt 4, and it also has a tapped hole in its smaller end into which is screwed the screw hook 6.

Head blocks 3, 3 are placed in slideways $2^a$, $2^a$ as shown in Fig. 1 with screw hooks 6, 6 juxtaposed. With these hooks are engaged the loops on the ends of spring 7. Safety bolt 4 has threaded ends and is put through hole $4^a$, $4^a$ in head blocks 3, 3, and nuts $4^b$, $4^b$, are screwed on said threaded ends outside of said blocks 3. In each of tapped holes $5^a$, $5^a$ Fig. 3 in the larger ends of head blocks 3, 3, are screwed the threaded stud bolts 5, 5. Hoop lugs 8, 8 having holes $5^b$ Fig. 2, are placed over the outer ends of stud bolts 5, 5 and secured by nuts as shown. Then the threaded ends of hoop 9 are placed in holes $9^a$, $9^a$, Fig. 2, in hoop lugs 8, 8, and nuts screwed thereon for tightening said hoop until spring 7 is under tension. Under each of hoop lugs 8 is placed a piece of sheet iron 10 to prevent said hoop lugs 8 from chafing the silo staves as they move back and forth under the action of spring 7. If desired, these chafing plates can be attached either to the silo or to the said hoop lugs. But because of the constant spring pressure, it is usually sufficient to place them unattached beneath said hoop lugs.

When coupled up as shown in Fig. 1, the spring 7, if of proper strength, will hold hoop 9 under sufficient tension to properly retain the staves of the silo and yet permit of the usual swelling and shrinking thereof. The nuts $4^b$, $4^b$ are placed in a position to permit of the necessary extension of spring 7 but do not allow said spring to be drawn beyond its elastic limit. When head blocks 3, 3 reach and bear against said nuts, spring 7 cannot be further extended and bolt 4 takes its place as a part of the hoop. When it is desired to take out spring 7, nuts $4^b$, $4^b$ are advanced on bolt 4 to render this easily possible. Then when the hoop strain comes on said bolt the head blocks 3, 3 are prevented from tilting toward each other by guides $2^a$, $2^a$.

Having thus explained my invention what I claim as new and desire to secure by Letters Patent is, 1. In a silo-hoop-spring device of the character described the combination of a spring, head blocks attached to the ends of said spring, said head blocks engaged as slides in slideways, and slideways for said head blocks, with the ends of a hoop connected to said head blocks.

2. In a silo-hoop-spring device of the character described the combination of a spring, head blocks attached to the ends of said spring, said head blocks engaged as slides in slideways, slideways for said head blocks, and the ends of a hoop engaged with said head blocks, with a safety bolt through said head blocks.

Signed at Bellingham in the county of Whatcom and State of Washington this 21st day of June A. D. 1915.

ALBERT STRICKERT.

Witnesses:
R. S. SIMPSON,
JOHN L. THOMAS.

Copies of this patent may be obtained for five cents each, by addressing the "Commissioner of Patents, Washington, D. C."